UNITED STATES PATENT OFFICE.

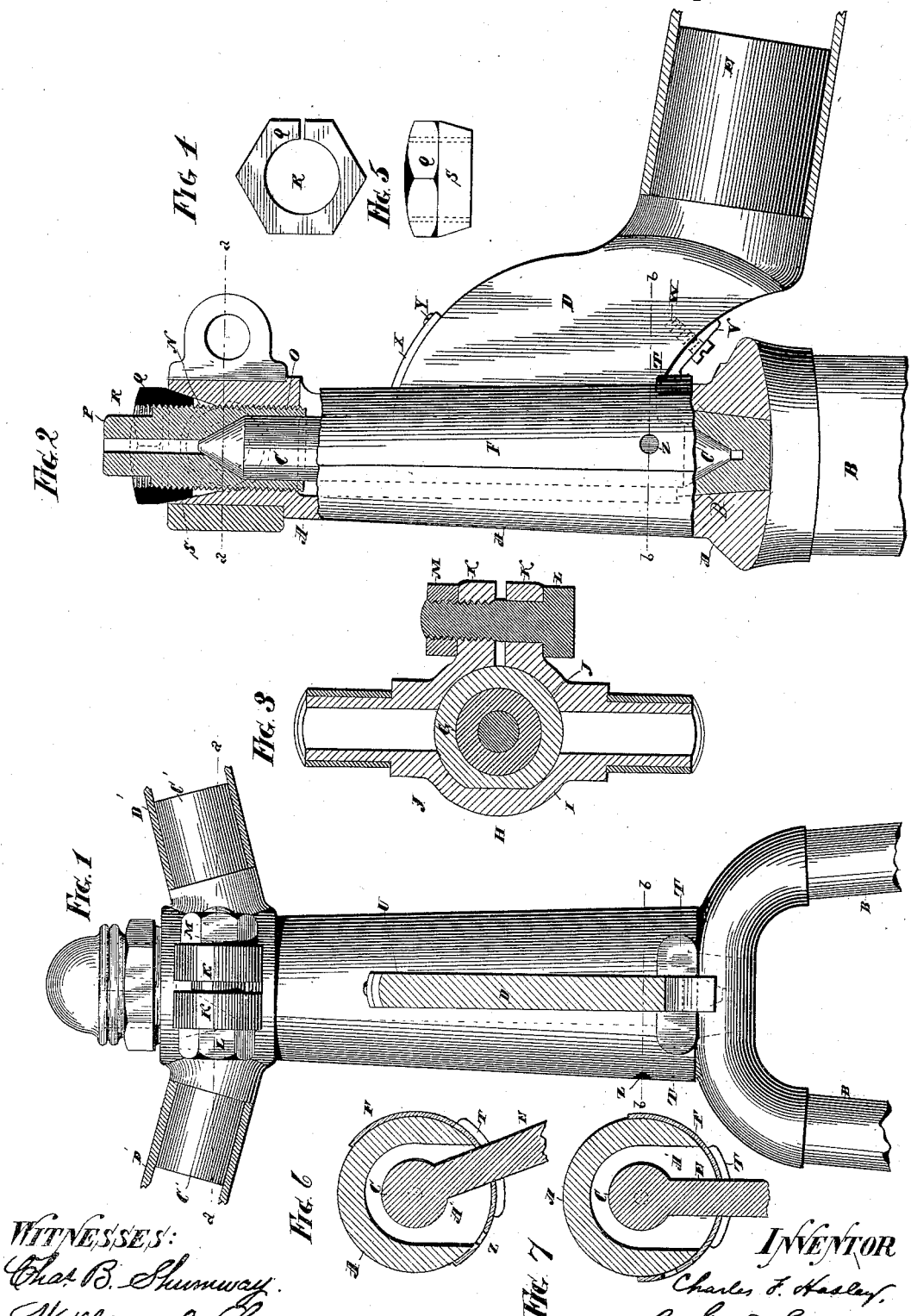

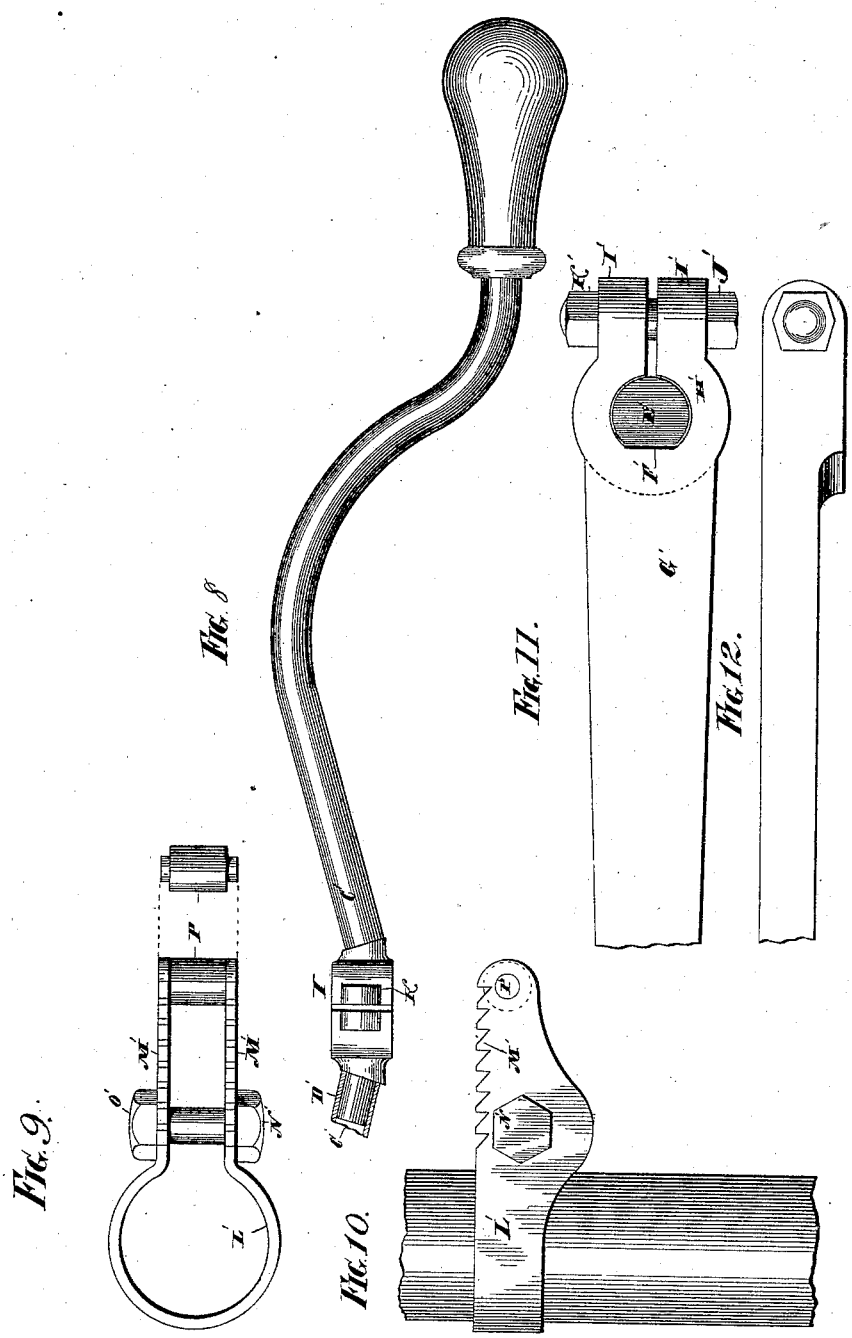

CHARLES F. HADLEY, OF CHICOPEE, ASSIGNOR TO THE OVERMAN WHEEL COMPANY, OF BOSTON, MASSACHUSETTS.

BICYCLE.

SPECIFICATION forming part of Letters Patent No. 380,886, dated April 10, 1888.

Application filed July 8, 1886. Serial No. 207,439. (No model.)

*To all whom it may concern:*

Be it known that I, CHARLES F. HADLEY, residing at Chicopee, in the county of Hampden and State of Massachusetts, have invented certain new and useful Improvements in Bicycles; and I do declare the following to be a full, clear, and exact description of the same, reference being had to the accompanying drawings, which form a part of this specification.

My invention relates to an improvement in bicycles, the object being to improve them in respect of their durability, convenience, and general efficiency.

With these ends in view my invention consists in a bicycle having certain details of construction and combinations of parts, as will be hereinafter described, and pointed out in the claims.

In the accompanying drawings, Figure 1 is a view, partly in section and partly in rear elevation, of a steering-head constructed in accordance with my invention. Fig. 2 is a similar view, showing the head in side elevation, with its upper and lower ends in section. Fig. 3 is a view of the head in transverse section on the lines $a\ a$ of Figs. 1 and 2. Fig. 4 is a detached plan view of the check-nut. Fig. 5 is a view thereof in side elevation. Figs. 6 and 7 are views of the steering-head in transverse section on the lines $b\ b$ of Figs. 1 and 2, and showing the provision for oiling the lower bearing of the spindle. Fig. 8 is a detached view in side elevation of the handle-bar, with one arm broken away. Fig. 9 is a detached plan view of the step. Fig. 10 is a view thereof in side elevation, as applied to a section of the back-bone. Fig. 11 is a detached view, showing the crank-shaft in end and the crank in side elevation; and Fig. 12 is a plan view of the latter.

The head A, fork B, spindle C, neck D, backbone E, and dust-shield F are of ordinary construction, except as specified.

The tubular upper end of the head is provided with a circular bearing, G, having a flat face, H, in front. Over this bearing is placed the split collar I of the handle-bar, the said collar being provided with an opening, J, corresponding to the bearing in shape, and with lugs K K, carrying a bolt L, furnished with a nut, M. The collar is clamped solidly upon the bearing by means of the bolt and nut, and prevented from turning thereon by the shape of the same and by the shape of its opening. The collar being split and the lugs located opposite the flat wall of the described opening, the maximum of spring and clamping effect in the collar is secured and all wear compensated for.

The upper end of the steering-head is provided with a smooth-walled conical chamber, N, and a screw-threaded circular chamber, O, the conical chamber being located above the circular chamber and opening into it. The upper end of the spindle C extends into such chambers, and has bearing in an externally screw-threaded adjustable bearing-screw, P, working in the thread of the said circular chamber. A split conical check-nut, Q, is provided for locking the bearing-screw in its adjustments, and has a screw-threaded circular opening, R, adapting it to be screwed down over the upper end of the said bearing-screw, and a smooth tapering outer face, S, which bears upon the smooth walls of the conical chamber mentioned. The described construction of the head and check-nut enables a powerful wedge effect to be secured with the check-nut without danger of breaking any threads.

The strap T, closing the lower end of the vertical slot U, formed in the dust-shield F to adapt it to fit over the neck E, is provided with an extension, V, whereby it is attached by a screw, W, to the under face of the neck E, as shown, the shield being secured to the neck by means of an arm, X, formed integral with it and extending outward from the upper end of the slot and attached to the upper face of the neck by a screw, Y. By securing the strap T permanently to the neck, as described, the detachment of the dust-shield from the same is facilitated for the reason that it does not involve the removal of the strap, as is necessary when the same is attached to the shield.

The dust-shield is provided at its lower end and near its forward edge with a hole, Z, located so that when the backbone is deflected clear to one side, as shown in Fig. 6 of the drawings, it will afford access to the interior chamber, A', of the head A for oiling the lower bearing, B', of the spindle C, and so that when the backbone is in its normal position it will be closed by the head, as shown by Fig. 7 of the drawings.

The collar I of the handle-bar is provided upon its opposite faces with upwardly-inclined lugs C' C', to which the handle-arms D' D' are respectively attached. By inclining the said lugs upwardly, as described, the handle-arms are elevated at their inner ends, so as to give more room under them, whereby greater safety and comfort are secured to the rider.

The step consists, in part, of a single strap, L', having its middle portion passed around the backbone D and drawn in at the outer face of the same, and having its ends extended outward therefrom in parallel lines, and serrated, as at M'. A heavy bolt, M', passing through the ends of the strap at a point closely adjacent to the outer face of the backbone, firmly secures the strap thereto. A post, P', shouldered at each end and interposed between the extreme outer ends of the arms, holds them apart. By passing the middle portion of the strap around the backbone and bolting it adjacent to the outer face of the same great strength in the step is secured, as there is nothing to give, wear, work loose, or strain on the inner side of the backbone, where the leverage, and hence the strain, is the greatest.

The crank-shaft is provided with a circular spindle end, E, having a flat face, F', as shown. The inner end of the crank G' is split and provided with lugs I' I' and with an opening, H', having a flat wall located opposite the said lugs, and two corresponding curved walls, respectively, extending from the opposite ends of the flat wall to the split in the crank. A bolt, J', carrying a nut, K', is mounted in the said lugs for clamping the crank onto the shaft. By splitting the crank and locating the lugs opposite the flat wall of the opening H', as described, the maximum of spring and clamping effect is secured and all wear compensated for.

I would have it understood that I do not limit myself to the exact construction and arrangement of parts herein shown and described, but hold myself at liberty to make such changes and alterations as fairly fall within the spirit and scope of my invention.

I am aware that a handle-bar having a split collar provided with lugs carrying a clamping-bolt is not new. I am also aware that a handle-bar having a depending flat-faced locking-lug and a steering-head having a recess to receive the same is not new. I do not therefore broadly claim such a collar or such locking devices, but only the construction and combination specified.

I am also aware that a tubular check-nut between the steering-head and adjusting-screw of a bicycle is not new. I do not therefore broadly claim such a nut, but only a nut having a smooth tapering outer face in the specified combination.

I am further aware that the combination, with a flat-faced crank-shaft, of a crank having a split end provided with a flat face and with lugs carrying a bolt is not new in a cycle, and that it is old to make a cycle-step of a strap passed around and bolted to the backbone of the vehicle.

Having fully described my invention, what I claim as new, and desire to secure by Letters Patent, is—

1. In a cycle, the combination, with a steering-head provided with a circular bearing having a flat face, of a handle-bar having a split collar provided with an opening corresponding in shape to the said bearing and with lugs, the collar being split and the lugs being located opposite the flat wall of such opening, and a bolt mounted in such lugs for clamping the collar upon the bearing and thus rigidly securing the handle-bar to the steering-head with a compensation for wear, substantially as set forth.

2. In the steering-head of a bicycle, the combination, with a head having a conical chamber and a screw-threaded circular chamber located in its upper end, the conical chamber being located above the circular chamber, of a spindle and an externally screw-threaded adjustable bearing-screw therefor, and a conical check-nut having a screw-threaded circular opening adapting it to be screwed over the said bearing, and a smooth tapering outer face bearing upon the walls of the conical chamber, substantially as set forth.

3. In the steering-head of a bicycle, the combination, with a head, a slotted dust-shield, and a backbone, of a strap closing the lower portion of the slot in the shield and secured to the backbone, substantially as set forth.

4. In the steering-head of a bicycle, the combination, with a head and a backbone, of a slotted dust-shield carried by the backbone and provided near its lower end with an opening affording access to the head for oiling its lower bearing when the backbone is deflected to one side and normally closed by the head, substantially as set forth.

5. In a bicycle, a handle-bar having a collar provided upon its opposite faces with upwardly-inclined lugs, and handle-arms secured to such lugs, substantially as set forth.

6. In a cycle, a step consisting in the combination, with a single strap passed around to nearly encircle a backbone or reach of a vehicle, with its free ends extended outward from such backbone or reach in parallel lines, of a bolt passing through such arms at a point closely adjacent to the backbone or reach for clamping the strap thereto, and a post shouldered at each end and interposed between the outer ends of the arms, substantially as set forth.

7. In a cycle, the combination, with a crank-shaft having a circular spindle end provided with a flat face, of a crank having its inner end split and provided with two perforated lugs, and with an opening having a flat wall located opposite the said lugs, and two corresponding curved walls respectively extending from opposite ends of the flat wall to the split in the crank, and a bolt mounted in the lugs and clamping the crank upon the spindle end, the specified shape of the spindle end and of the opening in the crank securing a rigid lock and compensation for wear, substantially as set forth.

In testimony whereof I have signed this specification in the presence of two subscribing witnesses.

CHARLES F. HADLEY.

Witnesses:
LUTHER WHITE,
JOHN A. SPOONER.